United States Patent [19]

Aldington

[11] 4,230,043
[45] Oct. 28, 1980

[54] RAILWAY CAR WHEELSET AND RAILS THEREFORE

[76] Inventor: Thomas Aldington, 13 Oxford Ct., New Hartford, N.Y. 13413

[21] Appl. No.: 889,881

[22] Filed: Mar. 24, 1978

[51] Int. Cl.$^2$ .................. B60P 17/00; B61F 13/00; F16H 19/00; F16H 55/00
[52] U.S. Cl. .................. 104/1 A; 238/15; 295/31 R; 295/34
[58] Field of Search .................. 238/15; 295/31, 34, 295/33; 104/1 A

[56] References Cited

U.S. PATENT DOCUMENTS

| 6,042 | 1/1849 | Flagg | 238/15 |
|---|---|---|---|
| 10,714 | 3/1854 | Wilder | 295/34 |
| 86,631 | 2/1869 | Beach | 238/15 |
| 512,855 | 1/1894 | Zimmerman | 295/34 |
| 638,827 | 12/1899 | Williams | 238/15 |
| 1,802,436 | 4/1931 | Maas | 238/15 X |

FOREIGN PATENT DOCUMENTS

| 185026 | 9/1936 | Switzerland | 295/34 |
|---|---|---|---|
| 182 | of 1866 | United Kingdom | 295/31 |
| 5980 | of 1883 | United Kingdom | 295/34 |

Primary Examiner—John J. Love
Assistant Examiner—Howard Beltran
Attorney, Agent, or Firm—Bruns & Jenney

[57] ABSTRACT

An improved railway car wheelset having a novel wheel configuration that permits greatly improved performance on existing and improved track. This means that substantially higher rolling speeds can be achieved without loss of stability and while maintaining the ability of the wheelset to self center and self steer. The improved performance is enabled primarily by forming the track engaging surface of each wheel of the wheelset with an outward arcuate projection also referred to herein as the convex annular portion of the wheel. This wheel configuration operates to reduce the magnitude of the effects that occur when disturbances cause the wheelset to deviate from centered position on the track.

6 Claims, 7 Drawing Figures

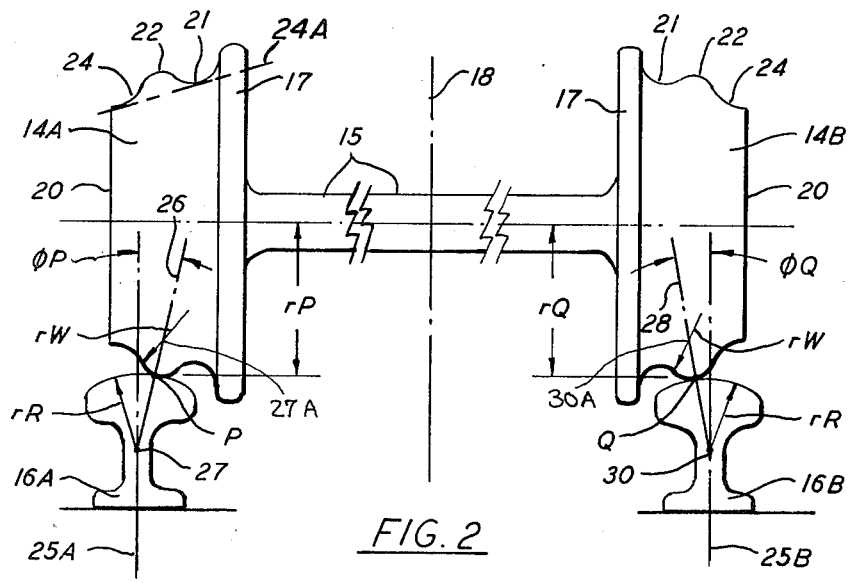
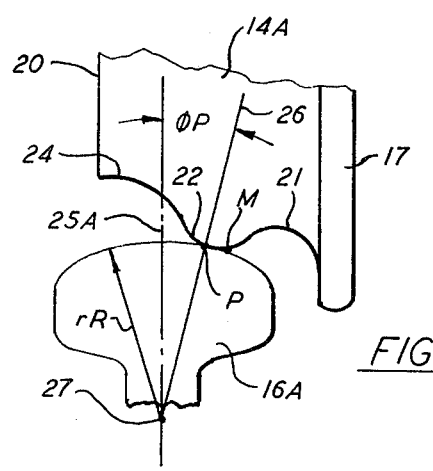
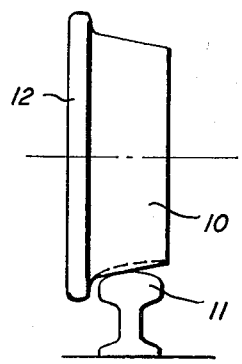
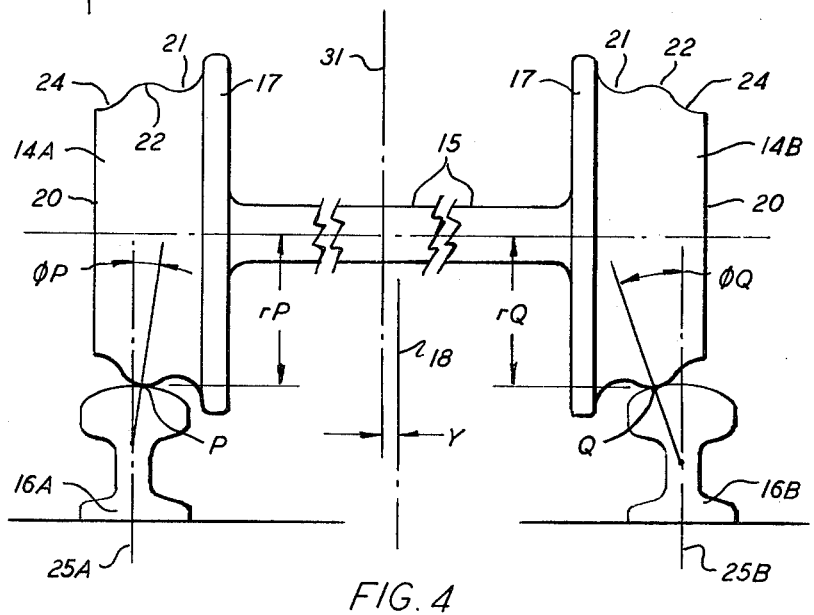
FIG. 2
FIG. 3
FIG. 1
FIG. 4

RAILWAY CAR WHEELSET AND RAILS THEREFORE

BACKGROUND OF THE INVENTION

This invention relates generally to railway wheels, axles and rails and has particular reference to an improved railway car wheelset having a novel wheel configuration.

For many years the track engaging surface of railway car wheels has been frusto-conical, the profile of the engaging surface being a straight line oblique to the horizontal in tangency with a convex rail radius. Wheels of this configuration, even when unworn, have a rolling speed upper limit that is considerably below that wanted and needed to make railroads competitive with trucking and flying. With worn wheels, rail misalignment and tight track curvatures, the upper speed limit is lowered further. Since correcting for rail misalignment and tight curvatures is a costly major undertaking, this means that the track engaging surfaces of the wheels must be machined frequently to compensate for wear and thereby attempt to operate as efficiently as possible.

The applicant's invention is a substantial departure from conventional frusto-conical car wheels, and the applicant is not aware of any prior art having a wheel configuration similar to his. U.S. Pat. Nos. 86,631 (Feb. 9, 1869) and 638,827 (Dec. 12, 1899) disclose substantially conventional frusto-conical car wheels. U.S. Pat. No. 10,714 (Mar. 28, 1854) to Wilder is the closest prior art known to the applicant in that it discloses a railway car wheelset wherein the track engaging surfaces of the wheels are curved. However, the wheels of U.S. Pat. No. 10,714 do not have a configuration like that of applicant's wheels nor can the patented wheelset function in the manner of applicant's wheelset, which manner of functioning is described hereinafter. In the Wilder patent, each wheel bears directly on the top of its rail and the contact point is at the point of the wheel's maximum convex radius, neither of which conditions exist in the present invention as will be explained.

SUMMARY OF THE INVENTION

The improved railway car wheelset of the invention comprises a pair of variable diametered wheels and an axle, the wheels being respectively secured at their inner sides to the opposite ends of the axle for rolling in unison therewith. Each wheel can be provided at its inner side with a radially outwardly projecting annular flange, and these flanges are spaced inwardly from the inside edges of their respective rails when the wheelset is in centered position on the track. The wheelset is thus able to have limited lateral movement with respect to the track before one or the other of the flanges contacts its rail. In this connection, it should be noted that the wheel flanges can be omitted without departing from the inventive concept.

Each wheel is contoured from the flange at its inner side to its outer side in a specific manner that determines how the wheelset will function when rolling on the track. Thus, adjacent the flange the wheel has a concave annular portion and then, moving outwardly, a convex annular portion and then either a frusto-conical portion or a second concave annular portion, the successive portions merging together in a smooth curve.

BRIEF DESCRIPTION OF THE DRAWINGS

FIG. 1 is an elevation of a railway car wheel that exemplifies the prior art, the wheel being shown in engagement with a track rail;

FIG. 2 is an elevation of a railway car wheelset embodying the present invention, the wheelset being shown in centered position on the track rails;

FIG. 3 is an enlarged elevation of a portion of the left hand wheel and rail of FIG. 2;

FIG. 4 is an elevation corresponding to FIG. 2 but showing the wheelset laterally displaced from the track centerline;

DESCRIPTION OF THE PREFERRED EMBODIMENT

Figure 6:
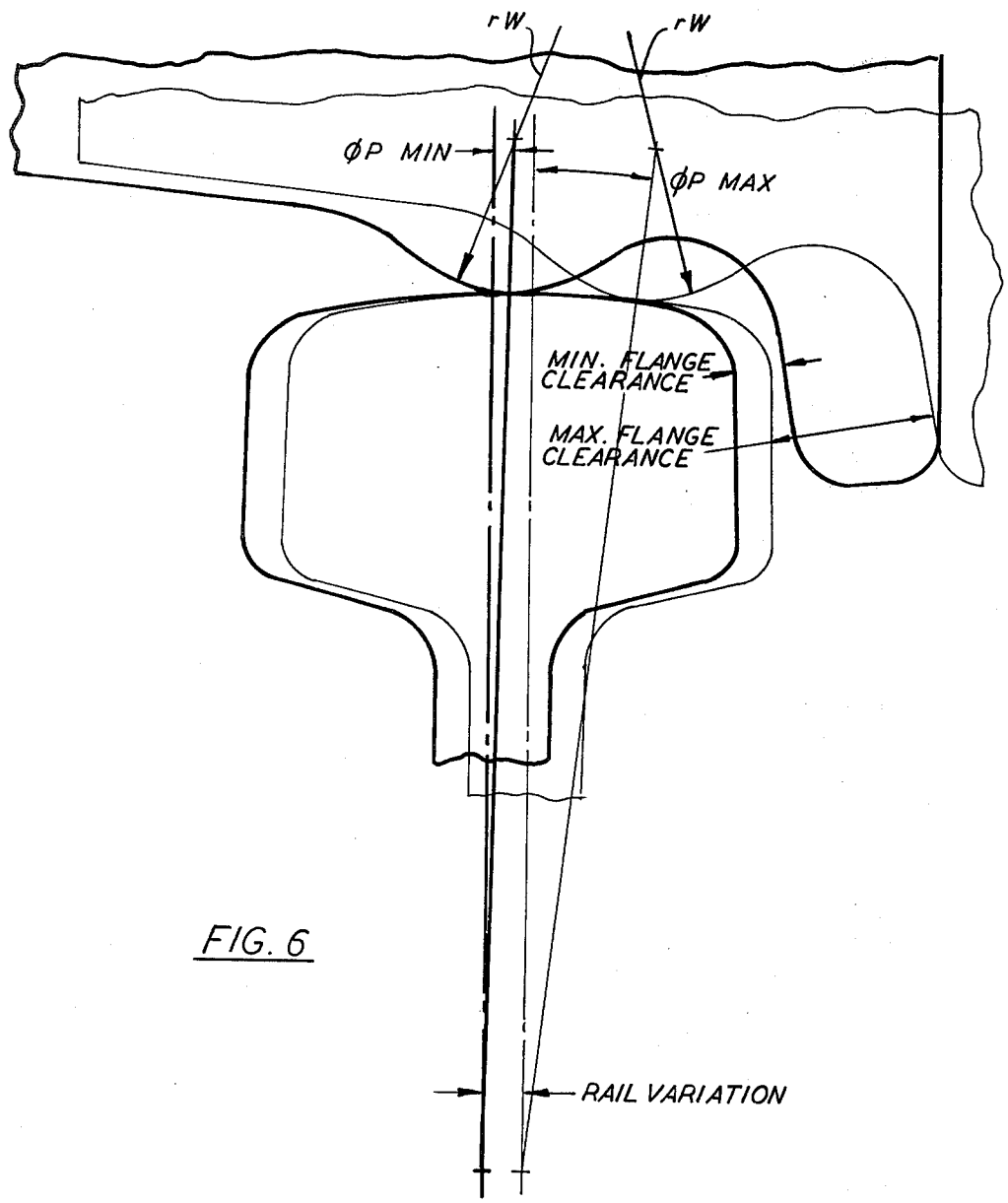
FIG. 6 is an enlarged, fragmentary elevation showing the relationship between a car wheel of the invention and a rail in the extreme positions of the wheel on the rail.

Having reference now to the drawings, FIG. 1 illustrates a railway car wheel that is typical of the prior art. In this wheel the portion 10 that rolls on the rail 11 is frusto-conical, the wheel being provided on its inner side, or side toward the centerline of the track, with the usual flange 12.

FIGS. 2-4 illustrate a railway car wheelset embodying the present invention on a convex radius or crowned rail of substantially conventional configuration. The wheelset comprises a pair of variable diametered wheels 14A and 14B that are fixed at their inner sides to the opposite ends of an axle 15. The two wheels and axle thus move in unison, with the wheelset being pivotally connected to the railway car (not shown) in a conventional manner. The wheels 14A and 14B engage and roll on the upper surfaces of rails 16A and 16B respectively, which rails are supported in the usual manner by ties (not shown) and together comprise the track.

Wheels 14A and 14B have identical configurations and each wheel has a flange 17 at its inner side, the inner sides of the wheels and rails being defined herein as the sides thereof towards the centerline 18 of the track. From its flange 17 to its outer side 20, the surface of each wheel has a concave annular portion 21, then a convex annular portion 22 and then a frusto-conical portion 24. The portion 24 could, alternatively, be a second concave annular portion. Stated generally, the diameter of each wheel decreases from its flange to its outer side, as shown by phantom line 2A in FIG. 2; except for the "bulge" or protrusion caused by the convex annular portion 22. The radius of the convex portion 22, which may vary under various conditions to be described hereinafter, is indicated by the arrows rW in FIG. 2.

In FIG. 2, the wheelset of the invention is shown in centered position on the track, i.e. with the wheelset centerline coincident with the centerline 18 of the track. Assuming negligible wear on wheels or rails, the wheel 14A engages its rail 16A at a point P and wheel 14B engages its rail 16B at a point Q, the distance between point P and point Q being the gage of the wheels. These points are displaced inwardly an equal amount from the centerlines 25A and 25B of the two rails.

The locations of points P and Q on the rails also determine the contact angle and the rolling radius for each wheel. The contact angle for wheel 14A is shown as $\phi P$ and is defined as the angle between the centerline 25A of rail 16A and a line 26 passing through a point 27 on the rail centerline, the wheel contact point P and a point 27A which is the center of radius rW. The point 27 is the center of the arc that defines the upper surface of the rail 16A, the radius for this arc being shown in FIGS. 2 and 3 as rR. The contact angle for wheel 14B is shown as $\phi Q$ and is, like $\phi P$, the angle between the centerline 25B of rail 16B and a line 28 passing through a point 30 on the centerline, the wheel contact point Q and a point 30A which is the center of radius rW. Again, point 30 is the center of the arc that defines the upper surface of the rail, the distance between point 27 and point 30 being the gage of the rails.

The rolling radius for wheel 14A is shown as rP and is the radius of the wheel rolling surface at the contact point P. Similarly, the rolling radius rQ for wheel 14B is the radius of the wheel rolling surface at the contact point Q. When the wheelset is in centered position on the track as indicated in FIGS. 2 and 3, $\phi P = \phi Q$ and $rP = rQ$. In this position, in accord with the invention the point at which the wheel diameter (and hence its radius) is at a maximum is inwardly of, or towards the track centerline from, the contact points P and Q. The point of maximum diameter for wheel 14A is best shown in the enlarged fragmentary view of FIG. 3 where it is indicated at M. The wheel 14B, of course, has a corresponding maximum diameter point inwardly of its contact point Q.

Figure 7:
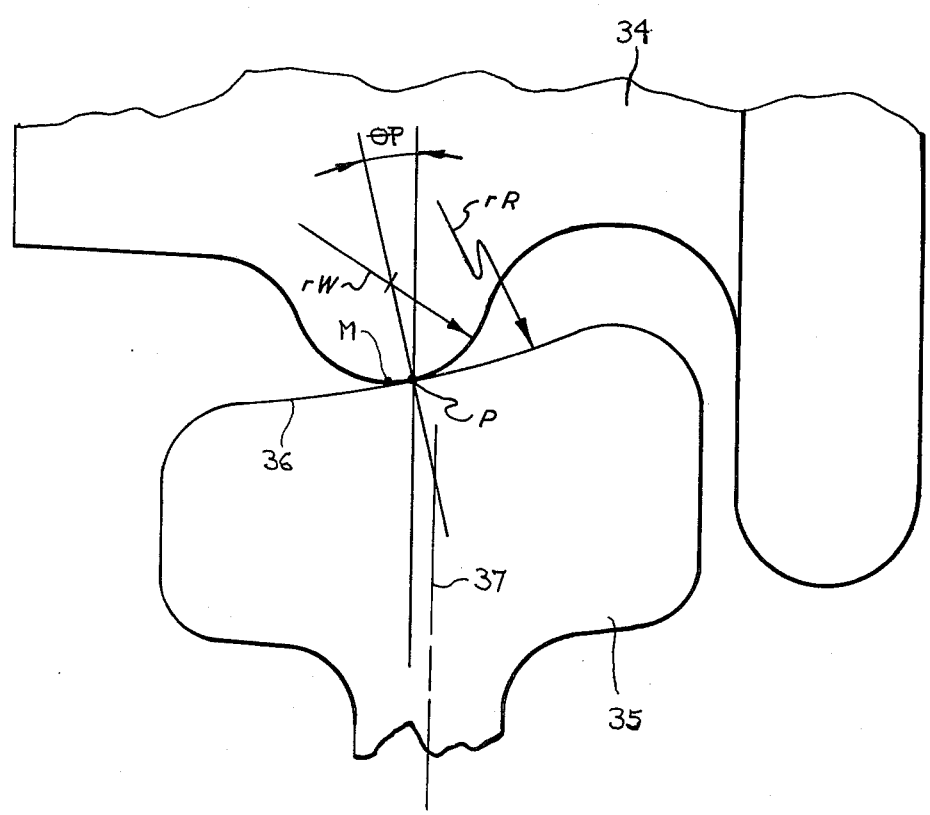
FIG. 7 is an enlarged, fragmentary elevation showing the relationship between a car wheel of the invention and an improved rail.

In FIG. 7, which corresponds to FIG. 3, a wheel 34 as described above is shown in engagement with an improved rail 35 which also embodies the invention. Rail 35, rather than having a conventional convex crowned upper surface, has a concave or inverted crowned upper surface 36 with radius rR as shown. With such a rail configuration, the basic wheel/rail relationship is essentially the reverse of that described above in connection with FIGS. 2–4. Thus, the contact point P of the wheel with the rail is located inwardly of the maximum diameter of the wheel, indicated at M, rather than outwardly and this makes the contact angle $\theta P$ a negative angle if contact angle $\phi P$ is considered to be positive.

The centered wheelset position shown in FIG. 2 is the optimum condition for railway car movement but it is a condition that hardly ever continues for more than a fraction of a second at a time. Thus, the wheelset is normally displaced to the left or right of centered position, this displacement being caused by such things as rail misalignment, by suspension forces imposed on the wheelset by the movement of supported loads and/or by inertia forces created within the wheelset as it rolls in a wobble or hunting fashion.

Self Centering

The wheelset of the invention has a self centering capability, while rolling on a straight track, that will now be described. Reference is made to FIG. 4 where the wheelset is shown with a lateral displacement to the left of the track centerline 18, the displacement being indicated at Y and being the distance between the track centerline and the centerline 31 of the wheelset. In this connection, it will be understood that the displacements and the changes in contact angles and rolling radii referred to hereinafter are very small, being exaggerated in the drawings for illustration.

With a displacement Y to the left and a slight axle centerline roll, rolling radius rP increases and contact angle $\phi P$ decreases for the wheel 14A which is on the same side of the track centerline as the wheelset centerline. The radius rP increases because the wheel contact point P moves towards the maximum radius point M, FIG. 3. At the same time, the rolling radius for wheel 14B decreases and its contact angle $\phi Q$ increases.

As the wheelset moves forward on the track in this displaced condition, the distance on its rail that wheel 14A travels will be greater than the distance on its rail that wheel 14B travels and therefore the wheelset will turn inward and its centerline 31 will move toward the track centerline 18. This will cause rP to decrease and rQ to increase while increasing $\phi P$ and decreasing $\phi Q$. This response to the disturbance, or cause of the displacement, tends to return the wheelset towards centered position on the track. As rolling continues, the wheelset will roll past the track centerline to the opposite side of the track causing the relationship of the rolling radii and contact angles to reverse which again turns the wheelset back towards the track centerline. The wheelset will thus continue to roll with a wobble or in a hunting fashion about the track centerline and this is the self centering motion. Friction forces at the contact points P and Q tend to reduce the wobble amplitude in time, other conditions remaining the same. A full self centering effect will be maintained as long as the lateral displacement in either direction doesn't cause either contact angle to decrease to zero.

Self-Steering

Figure 5:
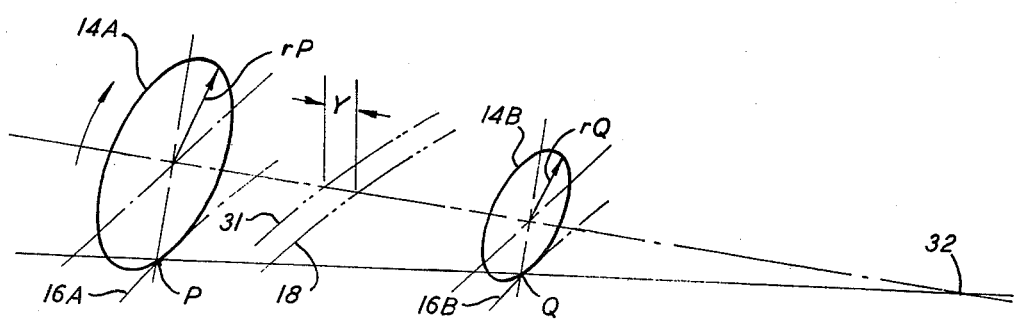
FIG. 5 is a diagrammatic perspective view to illustrate the self steering action of the wheelset of the invention on a curved track.

Reference is now made to FIG. 5 which shows diagrammatically and in exaggerated fashion the wheels 14A and 14B of the wheelset rolling on the rails 16A and 16B of a curved track. As indicated by the wheelset centerline 31, the wheelset has a lateral displacement Y to the left of the track centerline 18. The solid axle feature of the wheelset permits it to position itself outwardly and radially on the curved track such that it rolls steadily forward as a cone whose apex is at the center 32 of the track curvature.

The curved track displacement Y has the same effect as a disturbance caused displacement Y on a straight track discussed above. Thus, rolling radius rP increases and rQ decreases while $\phi P$ decreases and $\phi Q$ increases. This, as previously explained, causes wheel 14A to travel a greater distance on its track than wheel 14B travels on its track. For any given track radius, there is a particular self centering outward displacement Y that occurs from the rP/rQ relationship that is required to permit the wheelset to self steer around a curved track and roll steadily without wobble.

As with straight track disturbances, the outward displacement Y on a curved track is limited by not having either contact angle to decrease to zero. However, given any additional disturbance due to rail misalignment or load variations, the wheelset wobble now permissible will be further reduced by the amount of self steering displacement required for the curve.

Stability

At any rolling speed, the wheelset of the invention will wobble in response to a disturbance that moves it from a centered position on the track. The maximum displacement Y of the wheelset wobble due to a disturbance will steadily decrease when rolling is stable and steadily increase when unstable. Given any specific centered position values for rW,rR, the rolling radii and the contact angles, FIG. 2, there will be a rolling speed above which stability will end and instability will begin.

For a particular displacement Y and rolling speed of a wheelset, the rP/rQ relationship determines the angular speed at which the wheelset will turn inward and therefore the frequency with which a wheelset will wobble. The greater the difference between rP and rQ, the higher will be the wobble frequency and the greater will be the inertia forces developed within the wheelset itself, and therefore the lower will be the rolling speed at which instability begins. The centered position value of the contact angles $\phi P$ and $\phi Q$ determines the amplitude of wobble and/or the tightness of curve that can be negotiated and/or the wobble permissible on a particular curve.

The upper limit of rolling speed with prior wheelsets has been reached with unworn coned wheels, FIG. 1, and with a minimized contact angle with the wheelset in centered position on the track. In a coned wheel, the possible rP/rQ difference is reduced when the value of the contact angles in centered position is reduced. To achieve the current rolling speed upper limit, it has been necessary to remachine wheel cones frequently to compensate for increased rP/rQ differences coming from wheel contour wear, or to reduce the magnitude of disturbances by more perfectly aligning rails, or to increase track curvature which limits field use. The second and third alternatives are, of course, very costly.

Considerably higher rolling speeds (around 200 mph) are wanted and needed to maximize the social and economic value of railways in competition with trucking and flying. The rolling speed has been maximized in the above way for at least the last ten years. Any new approach to increasing stable rolling speeds on existing track requires a greater reduction in the magnitude of rP/rQ differences during wheelset displacements without reducing the centered position value of the contact angles.

In the present invention, the convex annular portions or protrusions 22, FIG. 2, of the wheels reduce rP/rQ differences on existing track considerably further than that now possible with the coned wheel. These convex annular wheel portions permit a much greater opportunity for higher rolling speed with stability, self steering, and self centering. Less restriction on rail alignment and track curvature is also obtainable because the centered position value of the contact angles can be increased. The exact values of rW and the contact angles for a particular application are dependent upon the ordering of priorities and chosen limits among rolling speed, track curvature, wear life, and rail misalignment.

Referring generally to FIG. 6, which illustrates wheel/rail relationships in extreme positions, there is a whole family of design options that are stable during rolling speeds near 200 mph. For example:

1. if a maximized rolling speed is most important, a wheel with a convex annular portion 22 having a small radius rW (less than one inch) rolling upon existing track for a specific displacement Y develops less than 1/7 the maximum rP/rQ difference that a 3° cone does. The value of the contact angles in centered position, the track curvature, and rail misalignment can be comparable to current practice. A wheel with a one inch convex radius rW then will be stable at more than twice the current maximum rolling speed (close to 300 mph);

2. if maximized rail misalignment is most important (about $\pm \frac{1}{4}$ inch) the centered position contact angles can be increased (approx. 4°) and an average convex radius rW (about 3 inches) chosen with current limits maintained on track curvature;

3. if minimum wheel wear is most important, contact point pressure (therefore wear) can be reduced by maximizing the convex radius rW (approx. 7 inches) and by reducing the contact angles in centered position (approx. $1\frac{1}{2}$°) while the limits on track curvature and rail misalignment are still about typical of current practice;

4. if minimum track curvature is most important (about one mile), the contact angles in centered position can be increased (approx. 5°) and an average convex radius rW (about 3 inches) chosen with current limits being kept on rail misalignment.

If the existing convex radius rR of the rail (approx. 6 inches) is increased, then even higher rolling speeds with self centering, tighter curves and more track misalignment are obtainable. This leads to two additional, new possibilities:

1. A whole family of adjustable options emerges as the rail radius rR is progressively increased from 6 inches to near infinity and the convex wheel radius rW and value of the contact angle in centered position are both progressively increased. This can lead to obtaining rolling speeds of up to 300 mph on a track curve radius under three miles with track misalignment of $\pm \frac{1}{4}$ inch.

2. Another whole family of duplicate adjustable options emerges as the radius rR of a rail having a concave upper surface as in FIG. 7 is progressively increased from 6 inches to near infinity and the convex wheel radius rW is progressively increased from one to seven inches and the contact angle in centered position is progressively decreased from minus 4° to minus $1\frac{1}{2}$°. A positive contact angle is not possible with a concave upper rail upper surface.

From the foregoing description it will be apparent that the invention provides an improved railway car wheelset having a novel wheel configuration that permits greatly improved performance on existing track. As will be understood by those familiar with the art, the invention may be embodied in other specific forms without departing from the spirit or essential characteristics thereof.

I claim:

1. A railway car wheel having a basically frusto-conical shape, the wheel having inner and outer sides, the wheel being formed with an annular curved convex protrusion extending radially outward from the basic frusto-conical shape at a location intermediate the inner and outer sides of the wheel, said annular curved convex protrusion forming the tread surface of the wheel.

2. A railway car wheelset comprising a pair of variable diametered wheels and an axle, the wheels having inner and outer sides and being respectively secured at their inner sides to the opposite ends of the axle for rolling in unison therewith, each of said wheels having a basically frusto-conical shape and being formed with an annular curved convex protrusion extending radially outward from the basic frusto-conical shape intermediate the wheel inner and outer sides, said annular curved convex protrusion forming the tread surface of the wheel.

3. In combination, a railway car wheelset and a pair of rails forming a railway track, the wheelset comprising an axle and a pair of variable diametered wheels of substantially frusto-conical configuration each having an inner and an outer side, the wheels being adapted to roll on the rails and being respectively secured at their inner sides to the opposite ends of the axle for rolling in unison therewith, each of the track rails having a crowned rolling surface, the tread surface of each wheel being formed with an annular curved convex protrusion, the gage tolerance of the wheelset being within the gage tolerance of the rails of the track.

4. The combination defined in claim 3 wherein the tolerance of the lateral displacement of the wheelset center from its position when the wheelset is in centered position on the track is less than the tolerance of the gage of the rails as the wheelset rolls along the track.

5. The combination defined in claim 3 wherein each of the track rails has an inverted crowned rolling surface.

6. The combination defined in claim 3 wherein the gage of the rails including tolerance is slightly greater than the gage of the wheelset including tolerance.

* * * * *